(12) United States Patent
Rho

(10) Patent No.: US 7,580,093 B2
(45) Date of Patent: Aug. 25, 2009

(54) DISPLAY DEVICE HAVING FOUR COLOR SUBPIXEL

(75) Inventor: Soo-Guy Rho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 709 days.

(21) Appl. No.: 11/205,521

(22) Filed: Aug. 17, 2005

(65) Prior Publication Data

US 2006/0072058 A1    Apr. 6, 2006

(30) Foreign Application Priority Data

Oct. 5, 2004    (KR) .................... 10-2004-0078981

(51) Int. Cl.
*G02F 1/1335* (2006.01)

(52) U.S. Cl. .................. 349/108; 349/109; 349/144

(58) Field of Classification Search .................. 349/108, 349/109, 106, 144
See application file for complete search history.

(56) References Cited

U.S. PATENT DOCUMENTS

| | | |
|---|---|---|
| 5,587,819 A | 12/1996 | Sunohara et al. |
| 5,642,176 A | 6/1997 | Abukawa et al. |
| 6,771,028 B1 * | 8/2004 | Winters .................... 315/169.1 |
| 7,030,553 B2 * | 4/2006 | Winters et al. .............. 313/504 |

FOREIGN PATENT DOCUMENTS

| | | |
|---|---|---|
| JP | 11194208 | 7/1999 |
| JP | 11337725 | 12/1999 |
| JP | 2002006303 | 1/2002 |
| JP | 2003139931 | 5/2003 |
| KR | 0186818 | 12/1998 |
| KR | 1020040023241 | 3/2004 |
| KR | 1020040043865 | 5/2004 |
| KR | 1020040054527 | 6/2004 |

OTHER PUBLICATIONS

Bellmeyer and Satzman; pp. 50-53; Chapter 2; the British Library—"The world's knowledge".

* cited by examiner

*Primary Examiner*—Mike Qi
(74) *Attorney, Agent, or Firm*—Cantor Colburn LLP

(57) ABSTRACT

A display device includes a plurality of pixels in a matrix. Each pixel comprises a first, second, third and fourth primary color subpixel disposed in multiple columns. The first and second primary color subpixels are disposed in a same column, and the third and fourth primary color subpixels are disposed in different columns.

25 Claims, 13 Drawing Sheets

DISPLAY DEVICE HAVING FOUR COLOR SUBPIXEL

This application claims priority to Korean Patent Application No. 2004-0078981 filed on Oct. 5, 2004 and all the benefits accruing therefrom under 35 U.S.C §119, and the contents of which in its entirety are herein incorporated by reference.

BACKGROUND OF THE INVENTION (a) Field of the Invention

The present invention relates to a four color display device, and in particular, to a display device having four primary color subpixels.

(b) Description of Related Art

Recently, flat panel display devices such as organic light emitting display devices, plasma display panel devices, and liquid crystal display devices have been widely developed.

A liquid crystal display (LCD) device is an example of a flat panel display device. The LCD device includes a liquid crystal (LC) panel assembly including an upper panel and a lower panel provided with two kinds of field generating electrodes such as pixel electrodes and a common electrode, and an LC layer with dielectric anisotropy interposed between the upper and lower panels. The pixel electrodes are arranged in a matrix and are electrically connected to switching elements such as thin film transistors (TFTs) to be sequentially applied with a data voltage for a row. The common electrode covers an entire surface of the upper panel and is supplied with a common voltage Vcom. The pixel electrode, the common electrode, and the LC layer form an LC capacitor, and the LC capacitor together with the switching element electrically connected to the LC capacitor is a basic unit of a subpixel.

A variation of a voltage difference between the field generating electrodes, i.e., a variation in the strength of an electric field generated by the field generating electrodes changes the transmittance of light passing through the LC panel, and thus desired images are obtained by controlling the voltage difference between the field generating electrodes.

The LCD device includes pixels, which each include three subpixels representing red, green, and blue colors, and displays colors using light from a light source provided with color filters representing red, green, and blue colors.

LCD devices are gradually being used for a wider variety of applications, and in particular, for television sets. Every possible effort is made in order to display colors similar to natural colors in the LCD devices used for television sets. For example, a trial has been undertaken in which color display capability is adjusted to a certain standard, for example, an EBU (Europe Broadcasting Union) standard, by increasing distribution density of a photoresist comprising color filters.

In such a case, a color sense of a blue filter representing the blue color is poor relative to other colors such as red and green. To remedy this, the color content ratio of a cold cathode fluorescence lamp (CCFL) used as a light source is adjusted to a higher luminance for the blue color.

However, the blue color has a high color temperature and thus has a tendency to change a color temperature of the entire CCFL, and thereby cyan, magenta, and yellow colors formed by a mixture of red, green, and blue colors look dark, unlike natural colors. In particular, a color sense of the cyan color is poor and thus a color display region is set to be a low temperature region. Accordingly, chroma of the cyan color is lowered relative to that of the yellow color or the magenta color. Additionally, a display capability for a low temperature color region increases, but in contrast, a display capability for a high temperature color region is decreased and thus the color display picture inclines to one side.

SUMMARY OF THE INVENTION

A motivation of the present invention is to solve the problems of the conventional technique.

A display device includes a plurality of pixels in a matrix. Each of the pixels comprises first, second, third and fourth primary color subpixels disposed in multiple columns. The first and second primary color subpixels are disposed in a same column.

An alternative exemplary embodiment of a display device includes pixels disposed in a matrix. Each pixel comprises a first primary color subpixel having a first area, a second primary color subpixel having a second area, a third primary color subpixel having a third area, and a fourth primary color subpixel having a fourth area. The first and second primary color subpixels are disposed in a same column. The third and fourth primary color subpixels are disposed in different columns.

BRIEF DESCRIPTION OF THE DRAWINGS

The present invention will become more apparent by describing exemplary embodiments thereof in detail with reference to the accompanying drawings, in which.

DETAILED DESCRIPTION OF THE INVENTION

Figure 1:
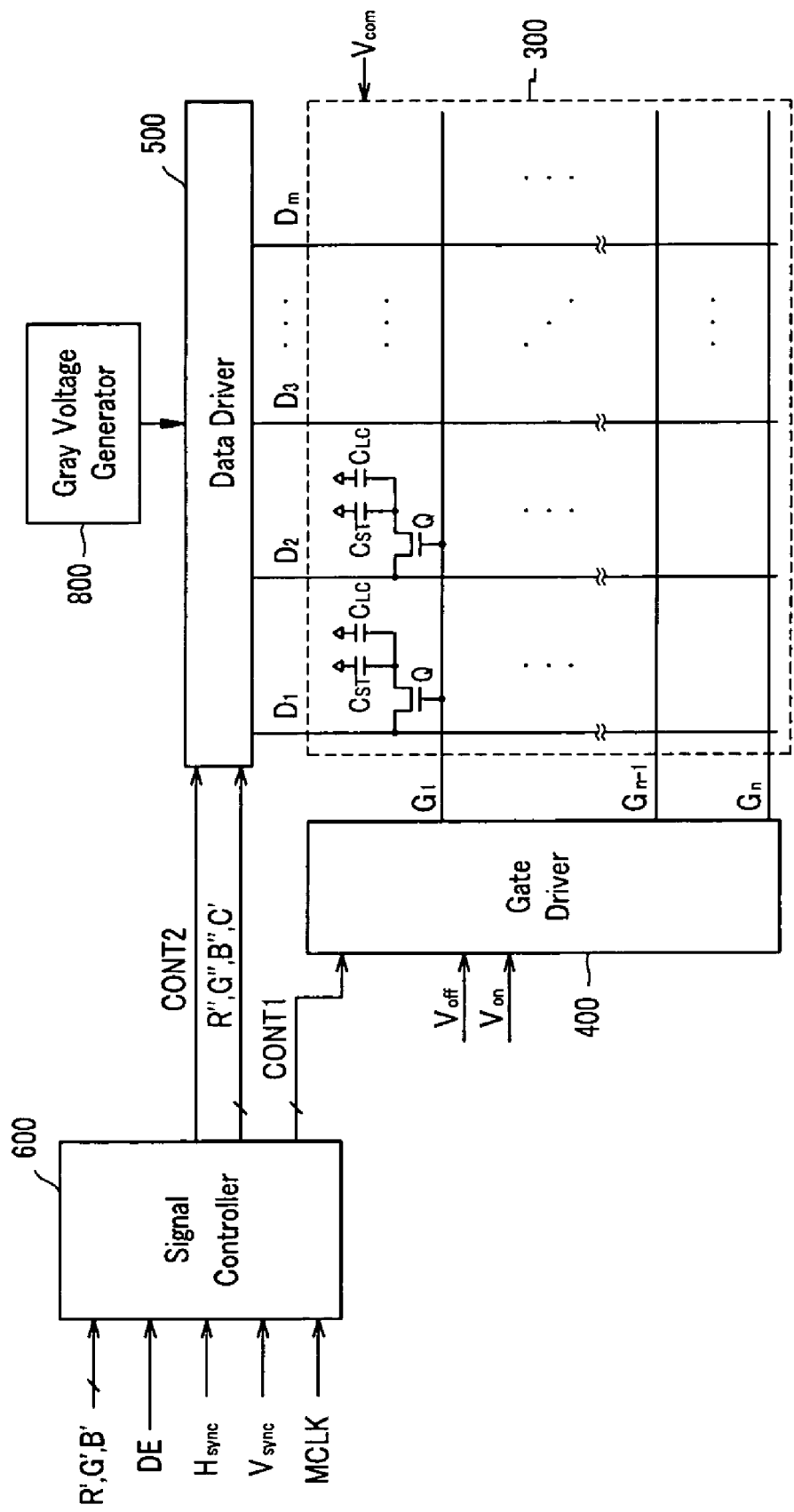
FIG. 1 is a block diagram of a liquid crystal display (LCD) device according to an exemplary embodiment of the present invention.

The present invention now will be described more fully hereinafter with reference to the accompanying drawings, in which exemplary embodiments of the invention are shown. This invention may, however, be embodied in many different forms and should not be construed as limited to the exemplary embodiments set forth herein.

In the drawings, a thickness of layers and regions may be exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 2:
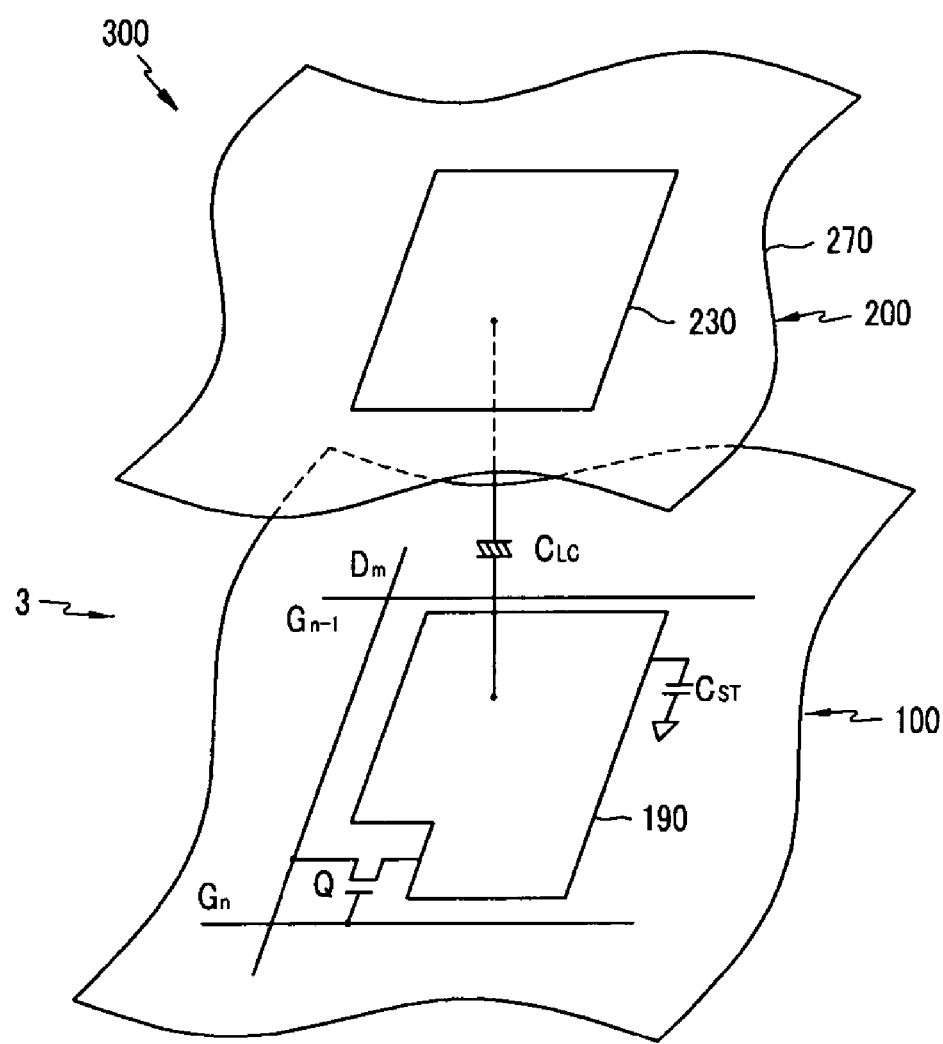
FIG. 2 is an equivalent circuit diagram of a subpixel of an LCD device according to an exemplary embodiment of the present invention.

FIG. 1 is a block diagram of a liquid crystal display (LCD) device according to an exemplary embodiment of the present invention, and FIG. 2 is an equivalent circuit diagram of a subpixel of an LCD device according to an exemplary embodiment of the present invention.

Referring to FIG. 1, an LCD device according to an exemplary embodiment includes a liquid crystal (LC) panel assembly 300, a gate driver 400 and a data driver 500 that are electrically connected to the LC panel assembly 300, a gray voltage generator 800 electrically connected to the data driver 500, and a signal controller 600 controlling the above elements.

Referring to FIG. 1, the LC panel assembly 300 includes a display signal lines $G_1$-$G_n$ and $D_1$-$D_m$, and subpixels electrically connected to the display signal lines $G_1$-$G_n$ and $D_1$-$D_m$ and arranged substantially in a matrix. In a structural view shown in FIG. 2, the LC panel assembly 300 includes a lower panel 100, an upper panel 200 and an LC layer 3 interposed between the lower and upper panels 100 and 200.

The display signal lines $G_1$-$G_n$ and $D_1$-$D_m$ are disposed on the lower panel 100 and include gate lines $G_1$-$G_n$ transmitting gate signals (also referred to as "scanning signals"), and data lines $D_1$-$D_m$ transmitting data signals. The gate lines $G_1$-$G_n$ extend substantially in a row direction and substantially parallel to each other, while the data lines $D_1$-$D_m$ extend substantially in a column direction and substantially parallel to each other.

Each subpixel includes a switching element Q connected to corresponding ones of the display signal lines $G_1$-$G_n$ and $D_1$-$D_m$, and an LC capacitor $C_{LC}$ and a storage capacitor $C_{ST}$ that are each electrically connected to the switching element Q. If unnecessary, the storage capacitor $C_{ST}$ may be omitted.

The switching element Q including a thin film transistor (TFT) is provided on the lower panel 100 and has three terminals: a control terminal electrically connected to one of the gate lines $G_1$-$G_n$; an input terminal electrically connected to one of the data lines $D_1$-$D_m$; and an output terminal electrically connected to both the LC capacitor $C_{LC}$ and the storage capacitor $C_{ST}$.

The LC capacitor $C_{LC}$ includes a pixel electrode 190 provided on the lower panel 100 and a common electrode 270 provided on the upper panel 200 as two terminals. The LC layer 3 disposed between the pixel and common electrodes 190 and 270 functions as a dielectric of the LC capacitor $C_{LC}$. The pixel electrode 190 is electrically connected to the switching element Q, and the common electrode 270 is supplied with a common voltage Vcom and covers an entire surface of the upper panel 200. As an alternative to the exemplary embodiment shown in FIG. 2, the common electrode 270 may be provided on the lower panel 100, and both the pixel and common electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line, which is provided on the lower panel 100 and overlaps the pixel electrode 190 via an insulator. The separate signal line is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For a color display, each subpixel uniquely represents one of primary colors (i.e., spatial division) or each subpixel sequentially represents the primary colors in turn (i.e., temporal division) such that a spatial or temporal sum of the primary colors is recognized as a desired color. FIG. 2 shows an example of the spatial division in which each subpixel includes a color filter 230 representing one of the primary colors in an area of the upper panel 200 facing the pixel electrode 190. Alternatively, the color filter 230 is provided on or under the pixel electrode 190 on the lower panel 100.

An example of a set of the primary colors includes red, green, and blue colors or complementary colors thereof, i.e., cyan, magenta, and yellow colors.

The six primary colors preferably satisfy the positions at the color coordinates defined by TABLE 1.

TABLE 1

| Red | Red, Reddish-Orange |
|---|---|
| Green | Green |
| Blue | Blue, Purplish Blue, Bluish-Purple |
| Cyan | Bluish-Green, Blue-Green, Greenish Blue |
| Magenta | Red-Purple, Reddish-Purple, Purplish-Pink, Reddish-Purple, Purple |
| Yellow | Yellow, Orange, Yellowish-Orange, Greenish-Yellow, Yellow-Green |

TABLE 1 is quoted from Billmeyer and Saltzman, Principles of Color Technology, 2nd Ed., John Wiley & Sons, Inc., pp. 50.

Hereinafter, a subpixel is referred to as a red, green, blue, or cyan subpixel depending on a color represented by the subpixel, and the red, green, blue, and cyan subpixels are denoted by reference characters R, G, B, and C, respectively, which also denote image signals for the colors.

One or more polarizers (not shown) are attached to at least one of the lower and upper panels 100 and 200.

Referring again to FIG. 1, the gray voltage generator 800 generates a first set of gray voltages and a second set of gray voltages related to a transmittance of the subpixels. The gray voltages in the first set have a positive polarity with respect to the common voltage Vcom, while the gray voltages in the second set have a negative polarity with respect to the common voltage Vcom.

The gate driver 400 is electrically connected to the gate lines $G_1$-$G_n$ of the LC panel assembly 300 and synthesizes a gate-on voltage Von and a gate-off voltage Voff from an external device to generate gate signals for application to the gate lines $G_1$-$G_n$.

The data driver 500 is electrically connected to the data lines $D_1$-$D_m$ of the LC panel assembly 300 and applies data voltages, which are selected from the gray voltages supplied by the gray voltage generator 800, to the data lines $D_1$-$D_m$.

The gate and data drivers 400 and 500 may include at least one integrated circuit (IC) chip mounted on the LC panel assembly 300 or on a flexible printed circuit (FPC) film in a tape carrier package (TCP), which are attached to the LC panel assembly 300. Alternately, the gate and data drivers 400 and 500 may be integrated into the LC panel assembly 300 along with the display signal lines $G_1$-$G_n$ and $D_1$-$D_m$ and TFT switching elements Q. The signal controller 600 controls the gate driver 400 and the data driver 500.

Operation of the above-described LCD device will now be described in detail.

The signal controller 600 is supplied with input image signals R', G', and B', and input control signals controlling a display of the LCD device. The input control signals include a vertical synchronization signal Vsync, a horizontal synchronization signal Hsync, a main clock MCLK, and a data enable signal DE, from an external graphics controller (not shown). After generating gate control signals CONT1 and data control signals CONT2 and converting and processing the input image signals R', G', and B' into processed four-color image signals R", G", B", and C' to be suitable for operation of the LC panel assembly 300 responsive to the input control signals and the input image signals R', G', and B', the signal controller 600 transmits the gate control signals CONT1 to the gate driver 400 and the processed four-color image signals R", G", B", and C' and the data control signals CONT2 to the data driver 500.

The gate control signals CONT1 include a scanning start signal STV for instructing the gate driver 400 to start scanning and at least one clock signal for controlling the output time of the gate-on voltage Von. The gate control signals CONT1 may further include an output enable signal OE for defining a duration of the gate-on voltage Von.

The data control signals CONT2 include a horizontal synchronization start signal STH for informing the data driver 500 of a start of data transmission for a group of subpixels, a load signal LOAD for instructing the data driver 500 to apply the data voltages to the data lines $D_1$-$D_m$, and a data clock signal HCLK. The data control signals CONT2 may further include an inversion signal RVS for reversing a polarity of the data voltages (with respect to the common voltage Vcom).

In response to the data control signals CONT2 from the signal controller 600, the data driver 500 receives a packet of the processed four-color image signals R", G", B", and C' for the group of subpixels from the signal controller 600, converts the processed four-color image signals R", G", B", and C' into analog data voltages selected from the gray voltages supplied by the gray voltage generator 800, and applies the analog data voltages to the data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q electrically connected to the gate lines $G_1$-$G_n$. The data voltages applied to the data lines $D_1$-$D_m$ are supplied to the subpixels through turned-on switching elements Q.

A difference between the data voltage and the common voltage Vcom is represented as a voltage across the LC capacitor $C_{LC}$, which is referred to as a subpixel voltage. The LC molecules in the LC capacitor $C_{LC}$ have orientations depending on a magnitude of the subpixel voltage, and molecular orientations of the LC molecules determine a polarization of light passing through the LC layer 3. The polarizer(s) converts the light polarization into light transmittance.

By repeating the above-described procedure by a unit of the horizontal period (which is denoted by "1H" and is equal to one period of the horizontal synchronization signal Hsync and the data enable signal DE), all of the gate lines $G_1$-$G_n$ are sequentially supplied with the gate-on voltage Von during a frame, thereby applying the data voltages to all subpixels. When a next frame starts after finishing one frame, the inversion control signal RVS applied to the data driver 500 is controlled such that the polarity of data voltages is reversed (which is referred to as "frame inversion"). The inversion control signal RVS may also be controlled such that the polarity of the data voltages flowing in a data line in one frame is reversed (for example, line inversion and dot inversion), or the polarity of the data voltages in one packet is reversed (for example, column inversion and dot inversion).

Arrangements of subpixels of an LCD device according to exemplary embodiments of the present invention will now be described in detail.

Figure 3A:
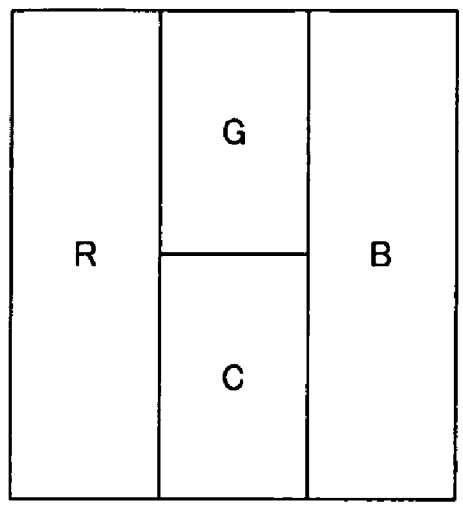
FIGS. 3A-3D show exemplary arrangements of four-color subpixels of an LCD device according to an exemplary embodiment of the present invention.
Figure 3B:
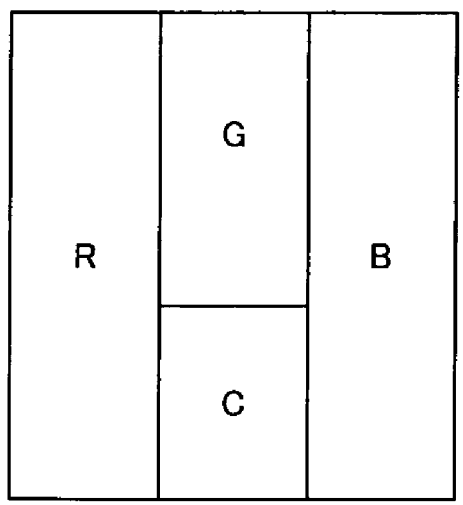
Figure 3C:
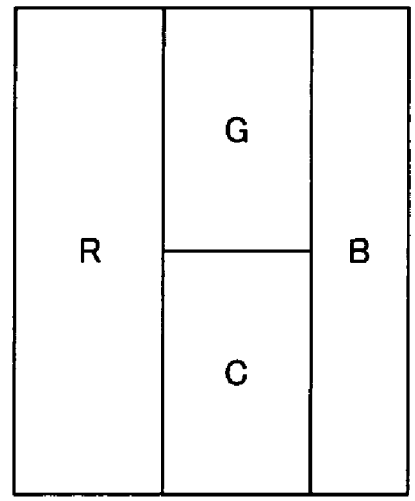
Figure 3D:
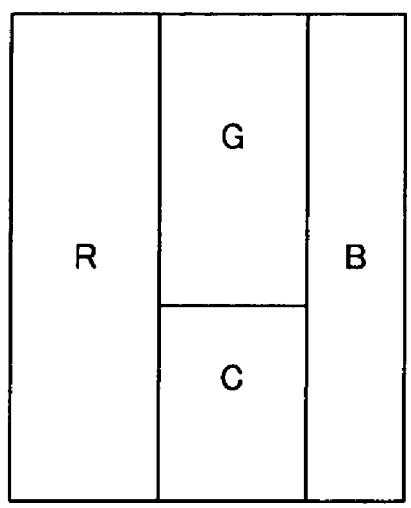
Figure 4:
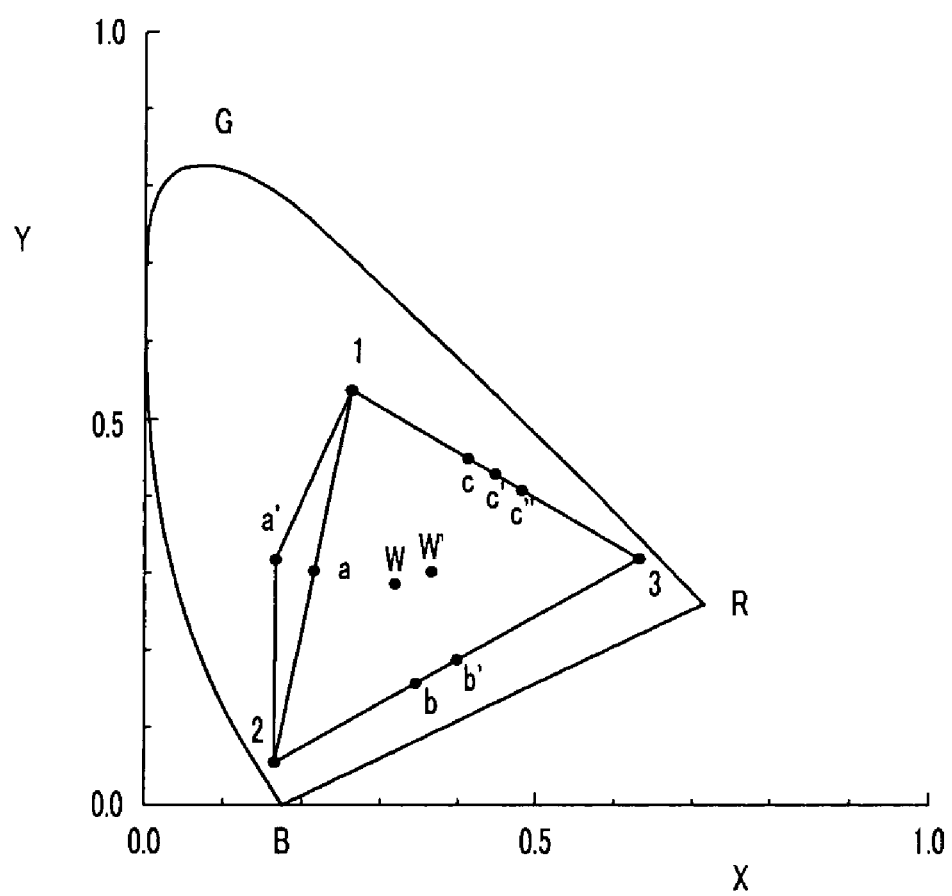
FIG. 4 shows schematic color coordinates responsive to arrangements of the four-color arrangements of an LCD device according to an exemplary embodiment of the present invention.

FIGS. 3A-3D show arrangements of four-color subpixels of an LCD device according to an exemplary embodiment of the present invention, and FIG. 4 shows schematic color coordinates responsive to arrangements of the four-color subpixels of an LCD device according to an exemplary embodiment of the present invention.

It should be noted that a set of red, green, blue, and cyan subpixels form a pixel that is a basic unit for displaying images in the exemplary embodiments of the present invention.

Referring to FIGS. 3A-3D, subpixels forming a pixel are arranged in columns such that red and blue subpixels R and B are disposed in columns opposite each other with respect to green and cyan G and C subpixels, which are disposed in a same column. Although, for ease of explanation, FIGS. 3A-3D only show subpixels arranged in columns, it should be understood that subpixels may also be arranged in rows.

In FIG. 3A, each of the red, green, cyan and blue subpixels R, G, C, and B is disposed in columns having an identical transverse width. The green subpixel G and the cyan subpixel G are disposed in a middle column and have identical areas to each other. The red and blue subpixels R and B are disposed at side columns, which are opposite to each other with respect to the middle column. In FIG. 3B, an area of the green subpixel G is larger than an area of the cyan subpixel C.

In FIG. 3C, a width of the blue subpixel B is smaller than a width of the red, green and cyan subpixels R, G and C, and, in FIG. 3D, the width of the blue subpixel B is smaller than the width of red, green and cyan subpixels R, G, and C, and the area of the cyan subpixel C is smaller than the area of the green subpixel G. A ratio of areas of the cyan subpixel C and the green subpixel G is in a range of about 1:3 to about 1:2 as shown, for example, in FIG. 3B. Alternatively, a ratio of areas of the cyan subpixel C and the green subpixel G is in a range of about 3:1 to about 2:1 as shown, for example in FIG. 3C. Additionally, as shown in FIGS. 3C and 3D, an area of the blue subpixel B is smaller than about 80% of an area of the red subpixel R.

FIG. 4 shows color coordinates represented by an LCD device having three primary color subpixels (hereinafter referred to as "three-color LCD") and an LCD device having four primary color subpixels (hereinafter referred to as "four-color LCD").

Referring to FIG. 4, a border having a horseshoe shape is shown, and ranges in which a display device can display colors are denoted by a triangle or a quadrilateral in an inner space of the border. For example, the triangle formed by three points (1, 2, 3) shows color coordinates represented by the three-color LCD, and the quadrilateral formed by four points (1, a', 2, 3) shows color coordinates represented by the four-color LCD. In this case, the color coordinates represented by the four-color LCD are obtained using the exemplary embodiment shown in FIG. 3D, and, for example, the area of the cyan subpixel C is about half of the area of the green subpixel G and an area of the blue subpixel B is about ⅘ the area of the red subpixel R.

Three points (a, b, c) represent cyan, magenta, and yellow colors made by a mixture of three primary colors such as red, green, and blue colors in the three-color LCD, respectively, and three points (a', b', c') represent cyan, magenta, and yellow colors made by a mixture of three primary colors such as red, green, and blue colors in the four-color LCD, respectively. However, the point a' representing the cyan color is not a mixed color but is an unmixed color.

As a certain color gets closer to the border of the horseshoe shape, a chroma for the certain color becomes higher. The chroma for the cyan color C is higher due to movement from the point a to the point a', and thus a range of colors that are capable of representation, i.e., color display capability, increases. An increase in color display capability responsive to addition of a cyan subpixel C is greater than an increase in color display capability responsive to an addition of a magenta subpixel M or a yellow subpixel Y. In other words, a connection line between the blue and red colors B and R and a connection line between the green and red colors G and R are disposed near the border and thus the color display capability has a limit to enlargement, and, if any enlargement occurs, addition of the magenta subpixel M or the yellow subpixel Y produces inferior color display capability improvement than addition of the cyan subpixel C.

Additionally, in response to the addition of the cyan subpixel C the points b and c disposed inclined with respect to a line between the blue color B and the green color G shift toward a center region between primary colors, thereby representing colors close to a standard light source.

Additionally, as an area occupied by a subpixel becomes smaller, color coordinates of a mixed color shift away from a color represented by the subpixel. In contrast, as an area occupied by the subpixel becomes larger, the color coordinates of the mixed color approach the color represented by the subpixel. For example, for points disposed between the blue color and the green color, as an area of the green subpixel G becomes larger, the points approach the green color, but as the area of the green subpixel G becomes smaller, the points move away from the green color. In this embodiment, color coordinates of an unmixed color depend on only a characteristic of a photoresist comprising the color filter 230 regardless of an area occupied by a subpixel.

Thus, as shown in FIG. 3A, the area of the green subpixel G is smaller than an area of a green subpixel of the three-color LCD and thus color coordinates of a mixed color of the green color and the red color are disposed substantially at a point c", and the area of the blue subpixel B is identical to that of the three-color LCD and thus color coordinates of a mixed color of the green color and the blue color still remains at point b.

In the case shown in FIG. 3B, the area of the green subpixel G increases relative to that shown in FIG. 3A and thus color coordinates of a mixed color of the green color and the red color shifts from the point c" to the point c'. In the case shown in FIG. 3C, the area of the blue subpixel B decreases relative to that shown in FIG. 3A and thus color coordinates of a mixed color of the blue color and the red color shifts from the point b to the point b'.

Additionally, two white coordinates W and W' are defined by a mixture of the three primary colors, and, for example, the white coordinate W is defined by an intersection of a straight line connecting points 1 and b and a straight line connecting points 3 and a, and the white coordinate W' is defined by an intersection of a straight line connecting points 1 and b' and a straight line connecting points 3 and a'.

Thus, addition of the cyan subpixel C causes the white coordinate W' to be located near a standard light source which is a broadcasting standard, and also mixed colors represented by a mixture of four primary colors represent characteristics of the standard light source. For example, a coordinate corresponding to the point c represents a yellow green color, but that corresponding to the point c' represents an accurate yellow color.

Furthermore, as described above, the chroma increases by adding the cyan color as a primary color relative to representation of the cyan color as a mixed color. Accordingly, a color display range of the LCD device lies from a low color temperature to a high color temperature as a whole.

FIGS. 5A-8D show exemplary arrangements derived from those shown in FIGS. 3A-3D.

Figure 5A:
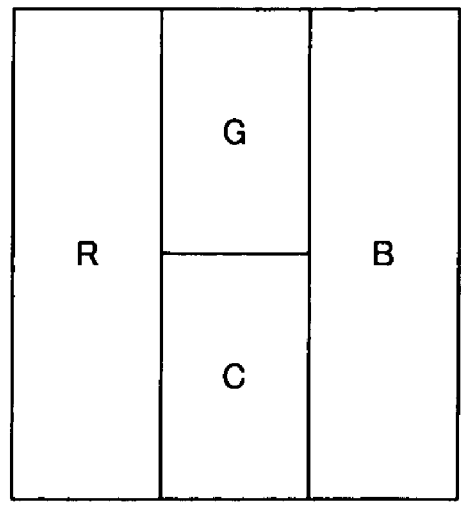
FIGS. 5A-5D show exemplary subpixel arrangements derived from the arrangement of subpixels shown in FIG. 3A.
Figure 5B:
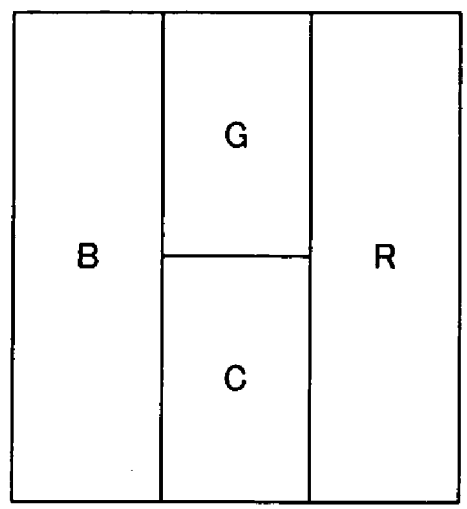
Figure 5C:
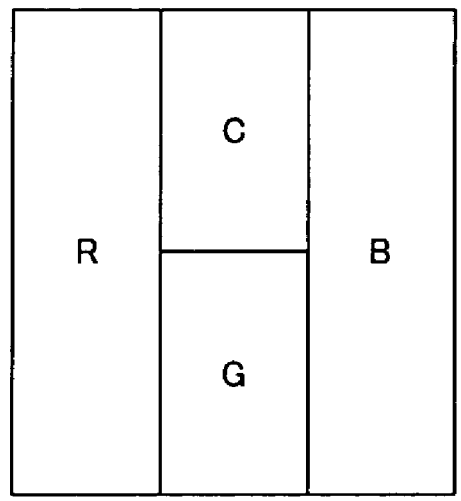
Figure 5D:
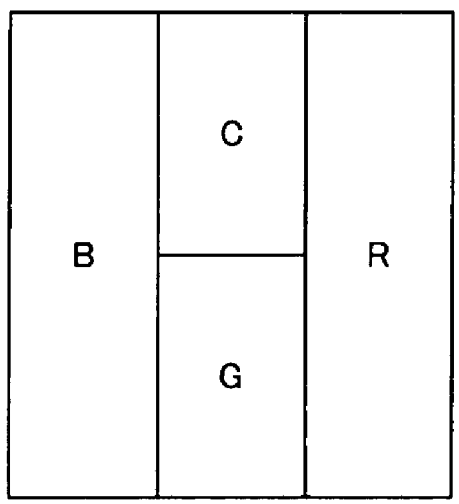

FIGS. 5A-5D show exemplary subpixel arrangements derived from that shown in FIG. 3A. FIG. 5A is same as FIG. 3A and is provided for reference. In FIG. 5B, the red and blue subpixels R and B are swapped relative to positions of the red and blue subpixels R and B shown in FIG. 3A. In FIG. 5C, the green and cyan subpixels G and C are swapped relative to positions of the green and cyan subpixels G and C in FIG. 3A. In FIG. 5D, the red and blue subpixels R and B are swapped relative to positions of the red and blue subpixels R and B shown in FIG. 3A and the green and cyan subpixels G and C are swapped relative to positions of the green and cyan subpixels G and C in FIG. 3A.

Figure 6A:
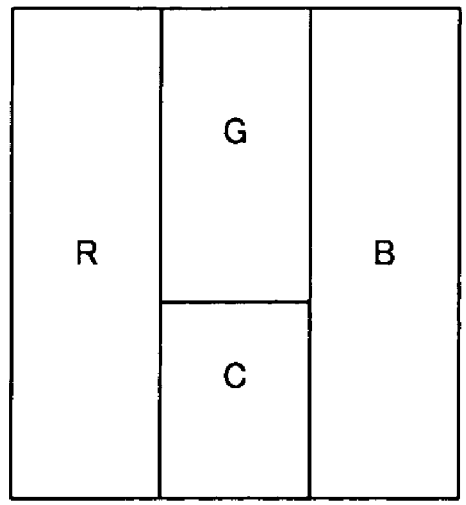
FIGS. 6A-6D show exemplary subpixel arrangements derived from the arrangement of subpixels shown in FIG. 3B.
Figure 6B:
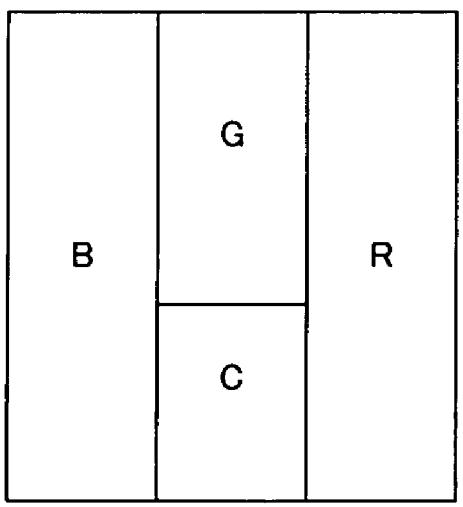
Figure 6C:
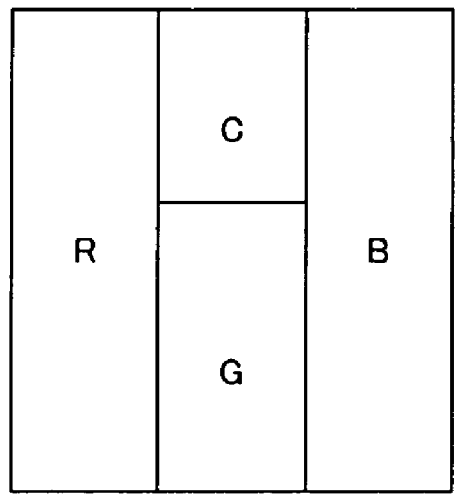
Figure 6D:
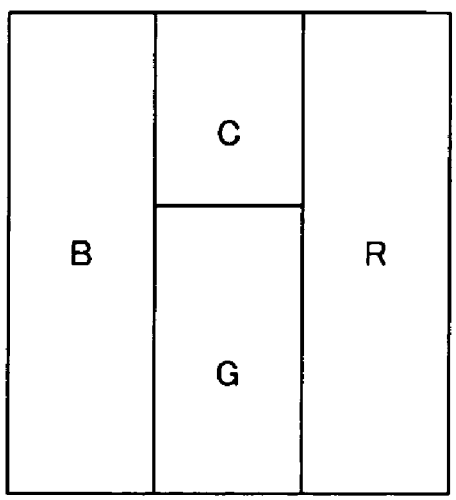

FIGS. 6A-6D show exemplary subpixel arrangements derived from that shown in FIG. 3B. FIG. 6A is same as FIG. 3B and is provided for reference. In FIG. 6B, the red and blue subpixels R and B are swapped relative to positions of the red and blue subpixels R and B shown in FIG. 3B. In FIG. 6C, the green and cyan subpixels G and C are swapped relative to positions of the green and cyan subpixels G and C in FIG. 3B. In FIG. 6D, the red and blue subpixels R and B are swapped relative to positions of the red and blue subpixels R and B shown in FIG. 3B and the green and cyan subpixels G and C are swapped relative to positions of the green and cyan subpixels G and C in FIG. 3B.

Figure 7A:
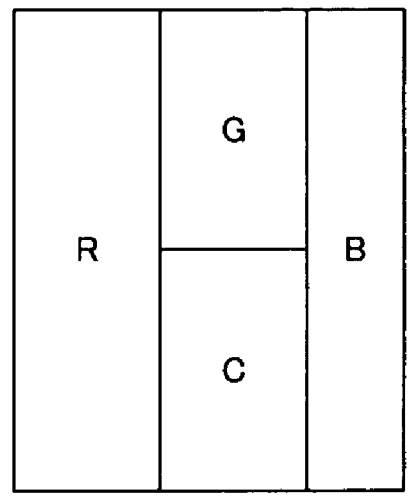
FIGS. 7A-7D show exemplary subpixel arrangements derived from the arrangement of subpixels shown in FIG. 3C.
Figure 7B:
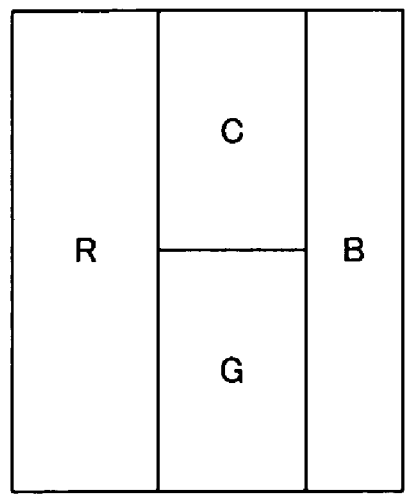
Figure 7C:
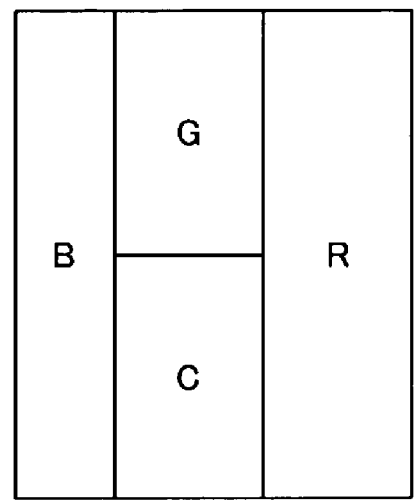
Figure 7D:
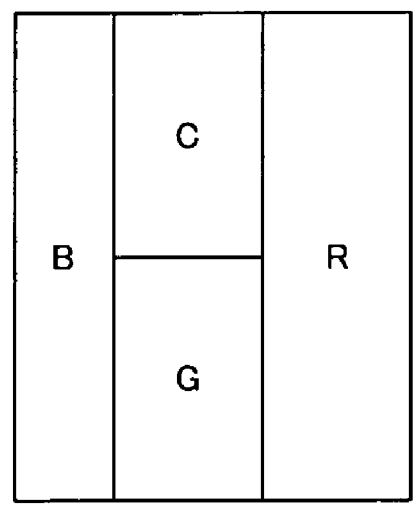

FIGS. 7A-7D show exemplary subpixel arrangements derived from that shown in FIG. 3C. FIG. 7A is same as FIG. 3C and is provided for reference. In FIG. 7B, the green and cyan subpixels G and C are swapped relative to positions of the green and cyan subpixels G and C in FIG. 3C. In FIG. 7C, the red and blue subpixels R and B are swapped relative to positions of the red and blue subpixels R and B shown in FIG. 3C. In FIG. 7D, the red and blue subpixels R and B are swapped relative to positions of the red and blue subpixels R and B shown in FIG. 3C and the green and cyan subpixels G and C are swapped relative to positions of the green and cyan subpixels G and C in FIG. 3C.

Figure 8A:
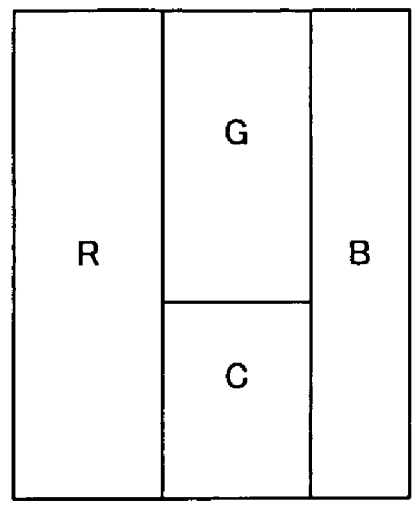
FIGS. 8A-8D show exemplary subpixel arrangements derived from the arrangement of subpixels shown in FIG. 3D.
Figure 8B:
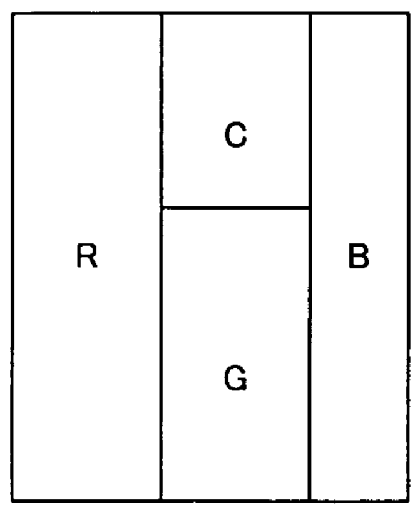
Figure 8C:
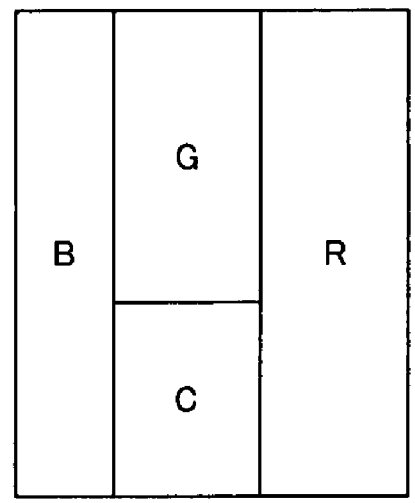
Figure 8D:
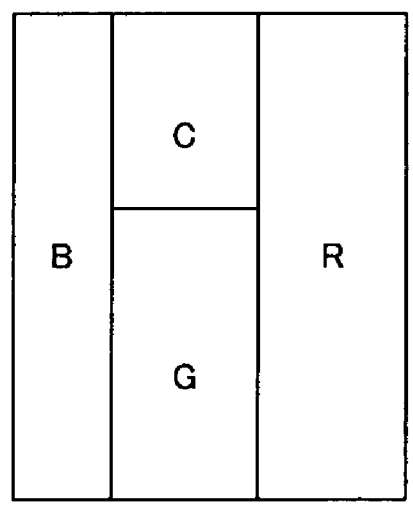

FIGS. 8A-8D show exemplary subpixel arrangements derived from that shown in FIG. 3D. FIG. 8A is same as FIG. 3D and is provided for reference. In FIG. 8B, the green and cyan subpixels G and C are swapped relative to positions of the green and cyan subpixels G and C in FIG. 3D. In FIG. 8C, the red and blue subpixels R and B are swapped relative to positions of the red and blue subpixels R and B shown in FIG. 3D. In FIG. 8D, the red and blue subpixels R and B are swapped relative to positions of the red and blue subpixels R and B shown in FIG. 3D and the green and cyan subpixels G and C are swapped relative to positions of the green and cyan subpixels G and C in FIG. 3D.

In each of the above-described arrangements, the green and cyan subpixels G and C are disposed at the middle column, however they may be disposed at either of the side columns. Additionally, although the above-described arrangements show the subpixels arranged in columns, the subpixels may alternatively be arranged in rows.

For example, a color temperature of a CCFL used for a light source of the LCD device is preferably more than about 10,000K (Kelvin temperature).

As describe above, addition of the cyan subpixel C increases the chroma of the cyan color and also represents mixed colors having a characteristic similar to a standard light source, and thus a color display capability of an LCD device increases.

While the present invention has been described in detail with reference to exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising a plurality of pixels in a matrix, wherein each pixel comprises a first primary color subpixel, a second primary color subpixel, a third primary color subpixel, and a fourth primary color subpixel disposed in multiple columns, the first and second primary color subpixels being disposed in a same column,
   wherein the first, second, third, and fourth primary color subpixels each comprise one of cyan, green, blue, and red subpixels.

2. The display device of claim 1, wherein the first and second subpixels are disposed at a middle column, the third primary color subpixel is disposed at a first side column, the fourth primary color subpixel is disposed at a second side column, and the first and second side columns are opposite each other with respect to the middle column.

3. The display device of claim 1, wherein the first and second subpixels have a same area.

4. The display device of claim 3, wherein the third and fourth subpixels have a same area.

5. The display device of claim 3, wherein an area of the third subpixel is larger than an area of the fourth subpixel.

6. The display device of claim 1, wherein the first and second subpixels correspond to the green and cyan subpixels, respectively, and the green and cyan subpixels are arranged in the same column.

7. The display device of claim 6, wherein the green and cyan subpixels have a same area.

8. The display device of claim 7, wherein the red and blue subpixels correspond to the third and fourth subpixels, respectively, and the red and blue subpixels have a same area.

9. The display device of claim 7, wherein the red and blue subpixels correspond to the third and fourth subpixels, respectively, and an area of the blue subpixel is smaller than an area of the red subpixel.

10. The display device of claim 9, wherein an area of the blue subpixel is smaller than about 80% of an area of the red subpixel.

11. The display device of claim 6, wherein an area of the cyan subpixel is larger than an area of the green subpixel.

12. The display device of claim 11, wherein a ratio of areas of the green and cyan subpixels ranges from about 1:3 to about 1:2.

13. The display device of claim 11, wherein the red and blue subpixels correspond to the third and fourth subpixels, respectively, and the red and blue subpixels have a same area.

14. The display device of claim 11, wherein the red and blue subpixels correspond to the third and fourth subpixels, respectively, and an area of the blue subpixel is smaller than an area of the red subpixel.

15. The display device of claim 14, wherein an area of the blue subpixel is smaller than about 80% of an area of the red subpixel.

16. The display device of claim 1, further comprising a light source unit providing light for the pixels, wherein a color temperature of the light source unit is more than about 10,000K.

17. The display device of claim 16, wherein the light source unit comprises a cold cathode fluorescence lamp.

18. A display device comprising a plurality of pixels in a matrix, wherein each pixel comprises a first primary color subpixel, a second primary color subpixel, a third primary color subpixel, and a fourth primary color subpixel disposed in multiple columns, the first and second primary color subpixels being disposed in a same column, wherein an area of the first subpixel is larger than an area of the second subpixel.

19. The display device of claim 18, wherein the third and fourth subpixels have a same area.

20. The display device of claim 18, wherein an area of the third subpixel is larger than an area of the fourth subpixel.

21. A display device comprising pixels disposed in a matrix, each pixel comprises a first primary color subpixel having a first area, a second primary color subpixel having a second area, a third primary color subpixel having a third area, and a fourth primary color subpixel having a fourth area, the first and second primary color subpixels being disposed in a same column, the third and fourth primary color subpixels being disposed in different columns,
   wherein the first, second, third, and fourth primary color subpixels each comprise one of cyan, green, blue, and red subpixels.

22. The display device of claim 21, wherein the first and second areas are equal, and the third and fourth areas are equal.

23. The display device of claim 21, wherein the first and second areas are equal, and the third and fourth areas are different.

24. The display device of claim 21, wherein the first and second areas are different, and the third and fourth areas are equal.

25. The display device of claim 21, wherein the first and second areas are different, and the third and fourth areas are different.

* * * * *